Oct. 27, 1959 H. C. KNARZER 2,909,884
LAWN MOWER ADJUSTMENT MECHANISM
Filed Feb. 8, 1957
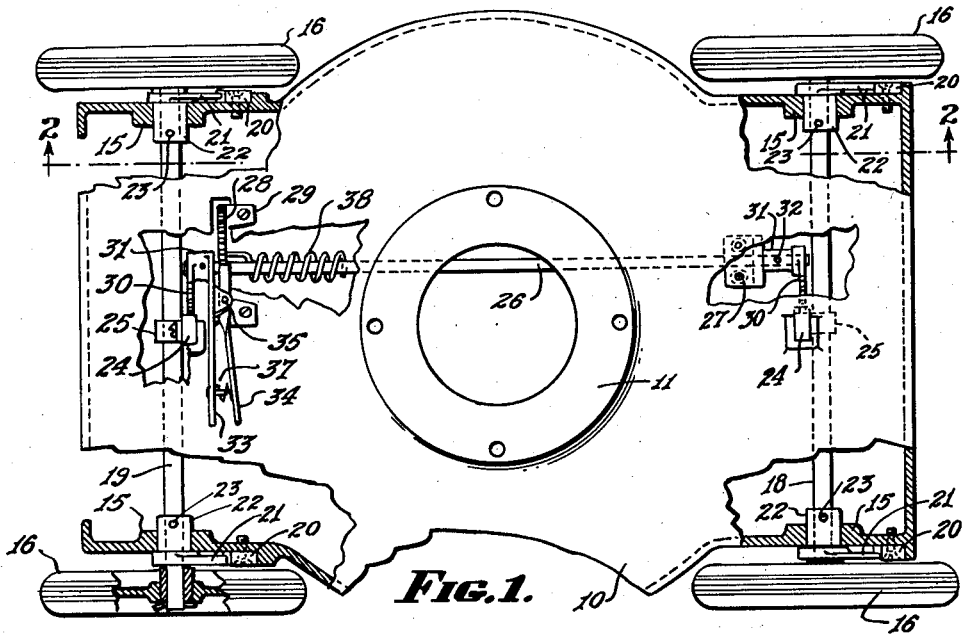
FIG.1.
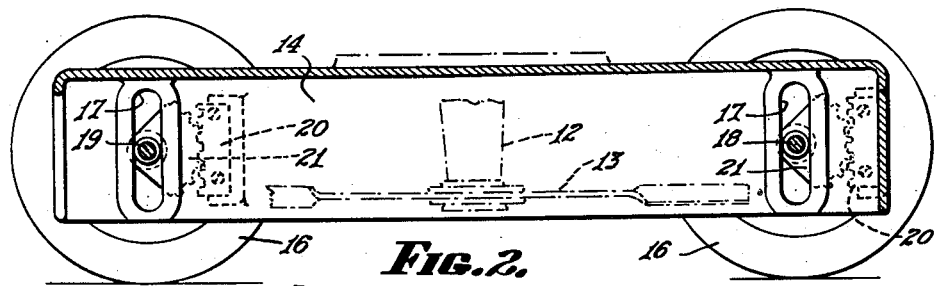
FIG.2.
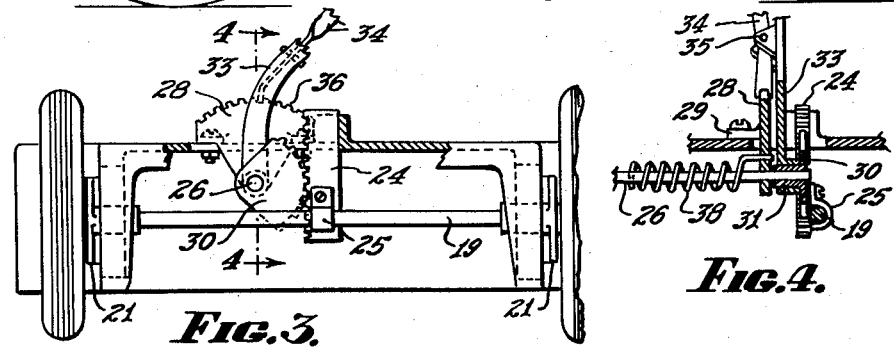
FIG.3.
FIG.4.
INVENTOR.
HERMAN C. KNARZER,
BY
Allen & Allen
ATTORNEYS.

United States Patent Office 2,909,884
Patented Oct. 27, 1959

2,909,884

LAWN MOWER ADJUSTMENT MECHANISM

Herman C. Knarzer, Richmond, Ind., assignor to Dille & McGuire Manufacturing Company, Richmond, Ind., a corporation of Indiana Application February 8, 1957, Serial No. 639,137

3 Claims. (Cl. 56—25.4)

This invention resides in the provision of mechanism by which the height of cut of a lawn mower may be easily and quickly adjusted.

An important object of this invention is to provide a mechanism of the type just referred to whereby all four wheels may be moved with respect to the lawn mower body by but a single adjustment of one member.

Another important object of this invention is to provide mechanisms which are simple to manufacture and which may be made standard so as to avoid having a large number of different parts.

In many of the rotary type lawn mowers now on the market it is necessary, each time one wants to change the height at which the rotating cutter blade operates, to adjust each wheel one by one so as to relocate it with respect to the mower chassis in order to raise or lower the blade with respect to the grass being cut. This not only takes time but it leaves room for error and is often a messy procedure.

Accordingly, one of the prime objects of this invention is to provide a single adjustment means whereby the mower chassis and blade carried thereby may be moved with respect to the grass being cut by a manipulation which does not involve changing the mounting of each wheel separately.

Another object of this invention is to provide simple and positive means for maintaining the mower chassis at the selected position.

These and other objects of this invention will become apparent to those skilled in the art from the description to follow and from reference to the accompanying sheet of drawings in which like numerals are employed to designate like parts and in which:

Figure 1 is a top plan view with parts broken away, parts removed and other parts in section of a lawn mower to which the instant invention has been applied, Figure 2 is a section on the line 2—2 of Figure 1, Figure 3 is a front elevation taken from the left of Figure 1 and with parts broken away, and Figure 4 is a section on the line 4—4 of Figure 3.

Referring now to the drawings a lawn mower chassis is generally indicated at 10. This chassis has a mount 11 on which there is normally a motor which, for the sake of keeping the drawings simple, is not shown. It will be readily apparent that there is a suitable drive from the motor through the means 12 to the blade 13. This drive and mechanism so far described does not constitute a specific part of this invention.

The skirt 14 is provided with four sturdy sections 15 in the region of each of the wheels 16. Each of the sections 15 is provided with a vertical slot 17. There is an axle 18 which extends through a pair of the slots 17 and on the ends of which axle are mounted two of the wheels 16. A similar axle 19 for the other two wheels 16 is also provided.

Bolted or otherwise secured to each of sections 15 is a rack 20. A gear segment 21 having a hub 22 which fits on the axle adjacent its end is pinned thereto as indicated at 23. The gear segment 21 and rack 20 have mating teeth which are engaged. It will be understood that each end of the axle 18 and each end of the axle 19 is similarly located and provided for. The wheels 16 are mounted on the axles outside of the segments and racks just described.

Each of the axles 18 and 19 has a rack 24 fixed thereto substantially centrally thereof. A suitable clamp means is indicated at 25 as perhaps best seen in Figures 3 and 4. A rod 26 extends at right angles to the axles 18 and 19 within the lawn mower chassis. This rod 26 has a bearing at one end in a member 27 and at the other end in a member 28. The member 27 may be bolted or otherwise secured to the lower side of the chassis 10. The member 28 has lugs 29 extending therefrom which lugs are fastened to the chassis 10 by bolts or the like. This member 28 has another function which will be described shortly.

A gear segment 30 is fixed at each end of the rod 26 and pinned thereto for movement therewith. The gear segments 30 and racks 24 have mating teeth which are meshed together. Each of the gear segments 30 has a hub 31 through which the rod 26 passes and it is in such hubs that the pins 32 are located for holding them to the rod 26.

A control handle 33 is fixed to the hub 31 of the gear segment 30 located adjacent the axle 19. When the control handle 33 is rocked the rod 26 is rotated. Rotation of the rod 26 produces relative movement between the axles 18—19 and the mower chassis by reason of the racks 24 and gear segments 30. When the handle 33 is moved counter-clockwise as viewed in Figure 3 the gear segment 30 is also moved counter-clockwise with the result that the rack 24 is moved upwardly. Each of the gear segments 30 being fixed to the common shaft 26, each of the racks 24 is therefore moved simultaneously with the other. In this manner the axles 18 and 19 are raised together which in effect amounts to a lowering of the mower chassis 10 and blade 13 upon counter-clockwise movement of the control handle 33, again as viewed in Figure 3. This will, of course, result in the grass being cut shorter. Movement of the handle 33 in the opposite direction will result in the blade being moved so as to permit a higher growth of the grass before being cut.

Associated with the handle 33 is a latch mechanism comprised of a lever 34 pivotally mounted to the handle 33 as indicated at 35. The upper end of the member 28 earlier mentioned is provided with a series of teeth 36. A spring 37 normally urges the members 33 and 34 apart. When the member 34 is pressed towards the handle 33 against the action of the spring 37, the lower end of such member 34 is disengaged from the teeth 36 of the member 28 whereupon the handle 33 may be rocked to desired position. When this position has been reached the member 34 is released and the lower end thereof will engage in the teeth 36 whereby to hold the handle 33 in selected position. In this manner the wheel axles 18 and 19 may be moved to any position within the limits of the slots 17 as guided and stabilized by the racks 20 and segments 21.

It has also been found desirable to employ a torsion spring 38 in connection with the rod 26. One end of this spring 38 is fixed to the rod 26 and the other end to the member 28 which is secured in the chassis 10. This spring serves as a counterbalance for the lift mechanism and is so arranged as to aid in changing the height of cut from that of a low position of the lawn mower chassis to that of a higher position.

It will be apparent to those skilled in the art, and it is a feature of this invention, that the guide racks 20 and guide segments 21 may be identical with the axle racks 24 and the segments 30 mounted on the rod 26. This greatly simplifies the manufacture of a mower incorporating this invention.

The operation of the instant invention is simple. It will be assumed that the axles 18 and 19 have been properly located and the wheels 16 rotatably mounted thereon. Each of the four racks 20 is engaged by its respective gear segment 21 pinned to the axles 18 and 19. The rod 26 which is rotatable in the bearings 27 and 28 has gear segments 30 pinned thereon which segments engage the racks 24 which are fixed to the axles 18 and 19. The control handle 33 is fixed to the hub 31 of one of the gear segments 30. In the drawings this has been illustrated in connection with the mechanism adjacent the axle 19. The spring 38 is connected between the rod 26 and member 28 so as to be under stress during all normal movements of the rod 26. The lower end of the member 34 will engage the teeth 36 in the upper end of the member 28.

In order to move the blade 13 closer to the ground one will simply push the upper end of lever 34 towards the handle 33 in order to disengage the lower end of the member 34 from the teeth 36. The control handle 33 is then moved in a counter-clockwise direction as viewed in Figure 3. This will result in a similar movement of the rod 26 and the pair of gear segments 30 fixed thereto. Such movement of this rod and these segments will cause the racks 24 to be moved upwardly. Upward movement of these racks will cause the axles 18 and 19 to be moved upwardly within the slots 17. This results in a lowering of the chassis 10 and blade 13 carried thereby. When the desired position has been reached the lever 34 will be released whereupon the spring 37 will urge the lower end of the member into engagement with the teeth 36 whereby to secure the mechanism in the selected position. Obviously it is necessary but to move the control handle 33 in the opposite direction when it is desired to move the blade 13 away from the ground.

It should be understood that although this invention has been described as applied to and embodied in certain specific structures and arrangements, changes may be made without departing from the scope and spirit of this invention. It is to be further understood that the specific structures and arrangements illustrated do not constitute a limitation on this invention except insofar as they are specifically set forth in the subjoined claims.

Having thus described the invention, what is claimed as new and what is desired to be protected by United States Letters Patent is:

1. In a lawn mower having a chassis comprised of a motor mount and depending peripheral skirt, a pair of wheel bearing axles, wheels rotatably mounted on said axles, and a rotatable blade within said skirt, the improvement which comprises: a pair of vertically disposed racks, one of said racks being fixed to one of said axles and the other of said racks being fixed to the other of said axles, a rod extending at right angles to said axles and rotatably mounted in said chassis, said rod being fixed against relative vertical movement with respect to said chassis, a pair of gear segments fixed on said rod, one gear segment engaging one of said racks and the other gear segment engaging the other of said racks, said skirt having vertical slots through which the ends of said axles protrude, four additional racks, one mounted on said skirt adjacent each of said slots, four additional gear segments, one on each end of each of said axles, each of said last mentioned gear segments engaging one of said last mentioned racks, and a control handle to rotate said rod whereby said axles are moved simultaneously and vertically relative to said slotted skirt.

2. The mechanism of claim 1 including an index member fixed on said chassis and having teeth, and a latch lever pivoted on said control handle and engageable with said teeth to maintain said handle in a selected position.

3. The mechanism of claim 1 including a torsion spring connected between said rod and chassis to serve as a counterbalance.

References Cited in the file of this patent

UNITED STATES PATENTS

| | | |
|---|---|---|
| 1,636,620 | Berry | July 19, 1927 |
| 1,890,361 | Beattie | Dec. 6, 1932 |
| 2,568,822 | Pervis | Sept. 25, 1951 |
| 2,680,339 | Murphy | June 8, 1954 |
| 2,692,466 | Brunts et al. | Oct. 26, 1954 |
| 2,730,374 | Rogers et al. | Jan. 10, 1956 |
| 2,776,844 | Wilkin | Jan. 8, 1957 |

FOREIGN PATENTS

| | | |
|---|---|---|
| 1,034,084 | France | Apr. 8, 1953 |